(12) United States Patent
Ochi (10) Patent No.: US 9,838,562 B2
(45) Date of Patent: Dec. 5, 2017

(54) INFORMATION PROCESSING SYSTEM (71) Applicant: Oki Data Corporation, Tokyo (JP)

(72) Inventor: Kengo Ochi, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 0 days.

(21) Appl. No.: 15/002,366

(22) Filed: Jan. 20, 2016

(65) Prior Publication Data

US 2016/0219183 A1 Jul. 28, 2016

(30) Foreign Application Priority Data

Jan. 18, 2015 (JP) .................................. 2015-014356

(51) Int. Cl.
*G06F 3/12* (2006.01)
*G06K 15/00* (2006.01)
*H04N 1/32* (2006.01)
*H04N 1/00* (2006.01)
*H04N 1/21* (2006.01)
*H04N 1/387* (2006.01)
*G06F 15/16* (2006.01)

(52) U.S. Cl.
CPC ..... *H04N 1/32096* (2013.01); *H04N 1/00244* (2013.01); *H04N 1/00344* (2013.01); *H04N 1/00795* (2013.01); *H04N 1/21* (2013.01); *H04N 1/3873* (2013.01); *H04N 1/00241* (2013.01); *H04N 2201/0039* (2013.01); *H04N 2201/0094* (2013.01)

(58) Field of Classification Search
CPC .... G06F 3/1275; G06F 3/1285; G06F 3/1286; G06F 3/1287; G06F 3/1288; G06F 3/129; G06F 3/1237; H04N 1/00241; H04N 1/00244; H04N 1/00344; H04N 1/00795; H04N 1/21; H04N 1/2166; H04N 1/32096; H04N 1/3873; H04N 1/00222; H04N 1/00225; H04N 1/32106; H04N 1/32432; H04N 1/00103
USPC ...... 358/1.11–1.18, 452, 453, 474, 537–540, 358/501, 505; 709/201–205, 217–221
See application file for complete search history.

(56) References Cited

U.S. PATENT DOCUMENTS 9,681,019 B2 * 6/2017 Miyazawa ......... H04N 1/32101
2001/0021037 A1 9/2001 Itoh
(Continued)

FOREIGN PATENT DOCUMENTS

JP 2005-094444 A 4/2005
JP 2010035149 A * 2/2010 ......... H04N 1/00217

*Primary Examiner* — Chad Dickerson
(74) *Attorney, Agent, or Firm* — Rabin & Berdo, P.C.

(57) ABSTRACT

An information system includes a multifunction apparatus and a first server which are linked to each other over a network. The multifunction apparatus includes a reading section, an information obtaining section, a first transmitter, and a memory. The reading section reads the image of an original document. The information obtaining section obtains a destination information from the first server, the destination information indicating a destination to which the image is transmitted. The first transmitter transmits the image to the destination. The first server includes a memory and a second transmitter. The memory stores the destination information therein. The second transmitter transmits the destination information in the memory to the multifunction apparatus.

14 Claims, 5 Drawing Sheets

(56) References Cited

U.S. PATENT DOCUMENTS

| | | | |
|---|---|---|---|
| 2006/0265242 A1* | 11/2006 | Kashioka | H04N 1/00968 382/100 |
| 2007/0165265 A1* | 7/2007 | Ito | H04N 1/00244 358/1.15 |
| 2008/0030818 A1* | 2/2008 | Nagahara | H04N 1/3873 358/537 |
| 2008/0055634 A1* | 3/2008 | Miyahara | H04N 1/00222 358/1.15 |
| 2008/0231914 A1* | 9/2008 | Motoyoshi | H04N 1/00411 358/474 |
| 2009/0193089 A1* | 7/2009 | Ochi | G06Q 10/107 709/206 |
| 2010/0027057 A1* | 2/2010 | Fujisawa | H04N 1/00217 358/1.15 |
| 2011/0222116 A1* | 9/2011 | Tomita | G06F 3/122 358/1.15 |
| 2011/0242592 A1* | 10/2011 | Tamura | H04N 1/00204 358/1.15 |
| 2012/0243035 A1* | 9/2012 | Takaoka | H04N 1/00225 358/1.15 |
| 2013/0268624 A1* | 10/2013 | Yagiura | H04L 67/025 709/217 |
| 2016/0134763 A1* | 5/2016 | Haapanen | H04N 1/001 358/1.15 |

* cited by examiner

INFORMATION PROCESSING SYSTEM

BACKGROUND OF THE INVENTION

Field of the Invention

The present invention generally relates to an information processing system in which a server apparatus and a multifunction apparatus having an image-reading function are linked to each other via a network.

Description of the Related Art

Conventional information processing apparatus are configured such that a scanner having an image reading function is linked to a plurality of personal computers via a network, for example, a local area network (LAN). Japanese Patent Publication No. 2005-94444 discloses one such system. The scanner reads an image from an original document and stores the image data into the shared folder in the personal computer. The user operates the human interface of the scanner to select a destination to which the image data is to be sent and a shared folder in the destination. The destination and shared folder have been registered in the scanner. The image data is transmitted to the personal computer at the destination address, and is then stored into the shared folder in the personal computer.

The apparatus disclosed in Japanese Patent Publication No. 2005-94444 has a drawback in that if the image data is to be sent to a destination address not registered in the scanner, the destination address must be inputted by the user. Inputting the destination address is a time-consuming operation and is a nuisance. In addition, input errors prevent the personal computer from communicating with the scanner.

For example, when a multifunction device having an image reading function is performing printing, if white streaks appears in a printed image, the user often cannot handle such a problem, and the printed image may require to be read and sent to the support center of the multifunction device. The image that has been read from the printed image must be sent to a destination address specified by the support center, in which case, errors may occur when the user inputs the specified destination.

SUMMARY OF THE INVENTION

The present invention was made in view of the aforementioned drawbacks.

An object of the invention is to provide an information processing system in which a multifunction device is linked to a server and the server sends destination information to the multifunction device upon request from the multifunction device.

An object of the invention is to provide an information processing system in which the image read by an image reading section can be transmitted to a specified destination without the need for the user to input the destination address.

An information system includes a multifunction apparatus and a first server which are linked to each other over a network. The multifunction apparatus includes a reading section, an information obtaining section, a first transmitter, and a memory. The reading section reads the image of an original document. The information obtaining section obtains a destination information from the first server, the destination information indicating a destination to which the image is transmitted. The first transmitter transmits the image read by the reading section to the destination. The first server includes a memory and a second transmitter. The memory stores the destination information therein. The second transmitter transmits the destination information in the memory to the multifunction apparatus, the destination information being transmitted in response to a request by the information obtaining section.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given byway of illustration only, and wherein.

DETAILED DESCRIPTION OF THE INVENTION

By way of preferred embodiments, the present invention will be described in detail with reference to the accompanying drawings.

First Embodiment

Figure 1:
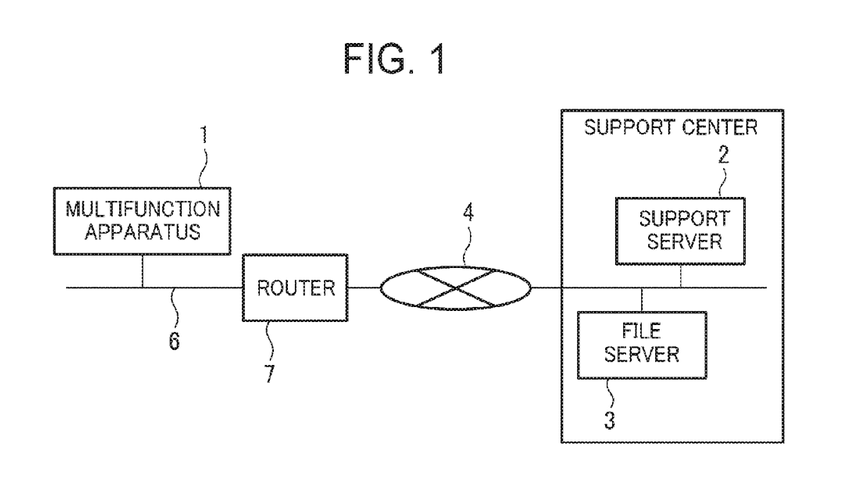
FIG. 1 illustrates an information processing system according to a first embodiment.
Figure 2:
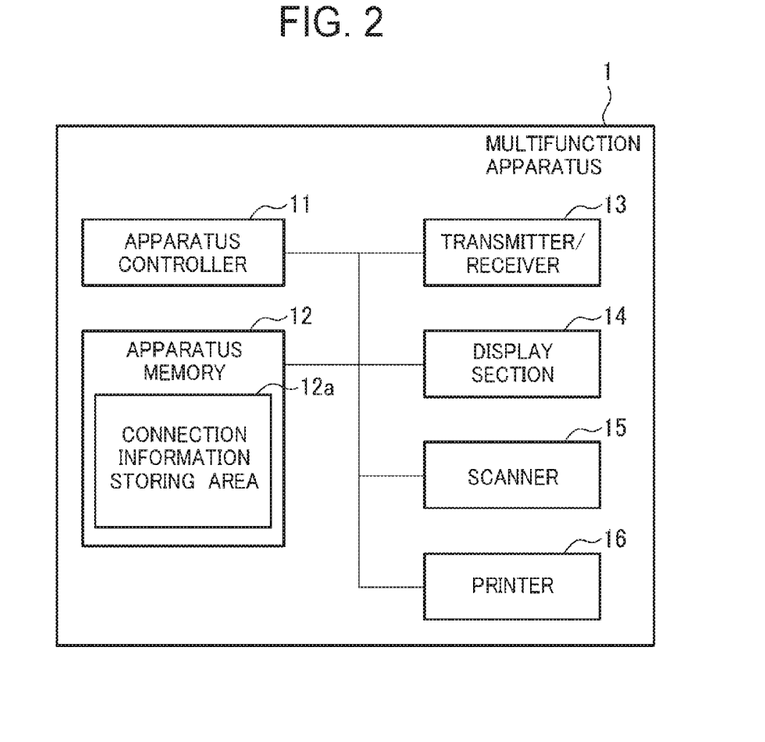
FIG. 2 is a block diagram illustrating a multifunction apparatus.
Figure 3:
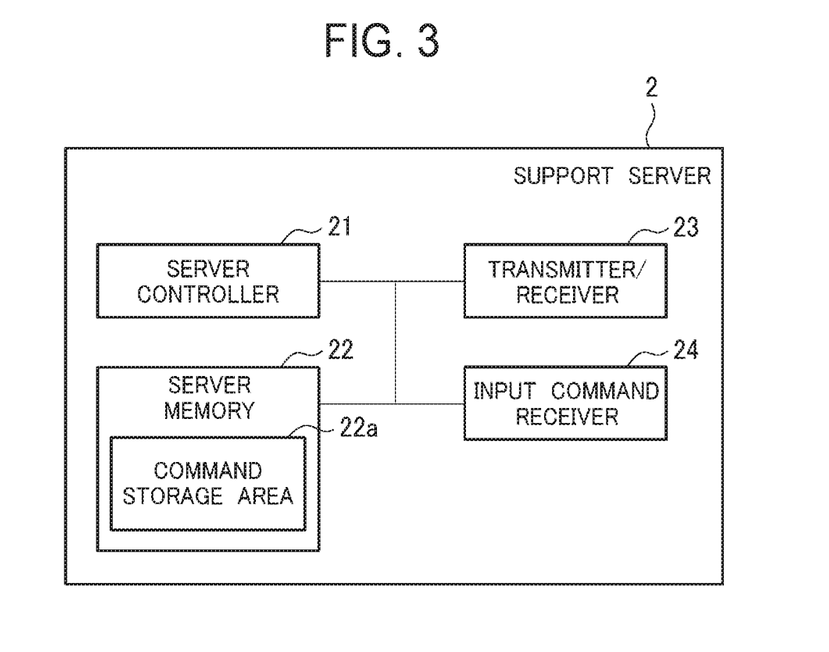
FIG. 3 is a block diagram illustrating a support server.
Figure 4:
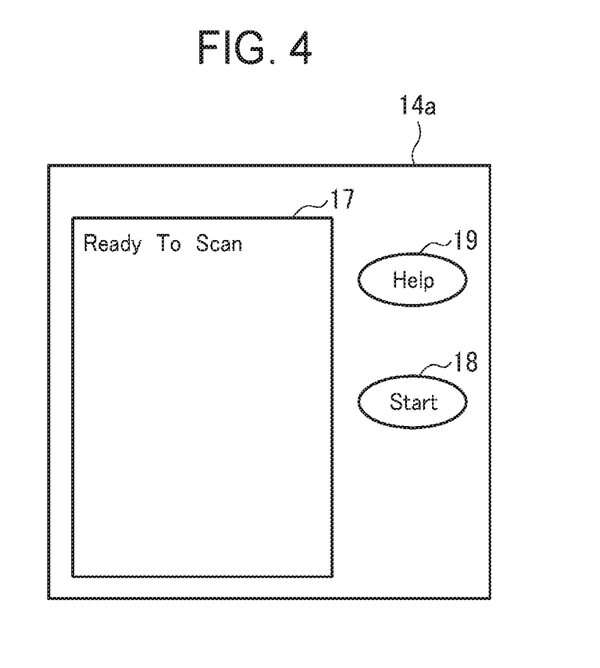
FIG. 4 illustrates an exemplary initial screen of the multifunction apparatus.
Figure 5:
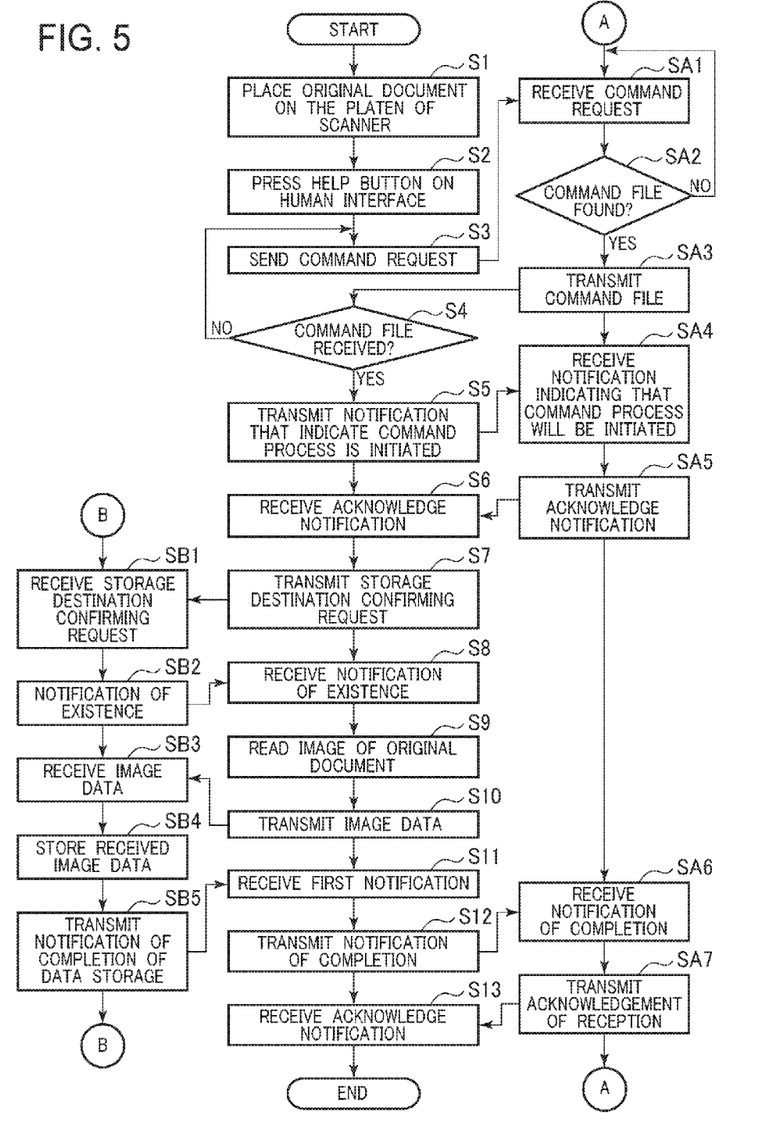
FIG. 5 is a flowchart illustrating an image data transmission process according to the first embodiment.

An information processing system according to the present invention will be described in detail with reference to FIGS. 1 to 5. FIG. 1 illustrates an information processing system according to a first embodiment. FIG. 2 is a block diagram illustrating a multifunction apparatus 1. FIG. 3 is a block diagram illustrating a support server 2. FIG. 4 illustrates an exemplary initial screen 14a of the multifunction apparatus 1. FIG. 5 is a flowchart illustrating an image data transmission process.

Referring to FIG. 1, the information system includes at least one multifunction apparatus 1 (e.g., multifunction peripheral (MFP)) located on the user side and a support server 2 and a file server 3 located on the support center side. The multifunction apparatus 1 is linked to the support server 2 and file server 3 via a network 4, e.g., the Internet.

The multifunction apparatus 1 includes an apparatus controller 11, an apparatus memory 12, a transmitter/receiver 13, a human interface 14, a scanner 15, and a printer 16. The multifunction apparatus 1 is linked to the network 4 through a LAN 6 and a router 7 on the user side, so that the apparatus controller 11 communicates with the support server 2 and file server 3 via the transmitter/receiver 13. The apparatus controller 11 drives respective sections in the multifunction apparatus 1, thereby performing various processes including a printing process. During an image data transmission process, the apparatus controller 11 transmits a command request to the support server 2, and receives commands from the support server 2. The apparatus memory 12 stores programs to be executed by the apparatus controller 11, a variety of items of data that the apparatus controller 11 manipulates when the apparatus controller 11 executes the programs, and the results of the processes performed by the apparatus controller 11. The apparatus memory 12 has a connection information storing area 12a in which connection information is held.

The transmitter/receiver 13 is capable of performing a function of transmitting and receiving, for example, image data over the LAN 6. The transmitter/receiver 13 takes the form of a network card. The human interface 14 includes a display screen 14a (e.g., LCD) and an inputting means (e.g., a touch screen). The display screen 14a shows an initial screen, the status of the multifunction apparatus 1, command buttons, and other information. The touch screen receives inputs from the user.

The scanner 15 functions as, for example, a reading section which optically reads an original document placed on a platen and then sends the read image data to the apparatus controller 11. The printer 16 prints the image data, which has been read from the original document on, for example, print paper.

The support server 2 or a first server supports recovery from a malfunction that has occurred during a printing process on the user side. As shown in FIG. 3, the support server 2 includes a server controller 21, a server memory 22, a transmitter/receiver 23, and an input command receiver 24. The server controller 21 is linked to the network 4 via the transmitter/receiver 23, and controls respective sections within the support server 2, reception of a command request from a malfunctioning external apparatus, e.g., the multifunction apparatus 1, during an image data transmission process, and reply to the command request.

The server memory 22 stores programs to be executed by the server controller 21, various items of data handled by the programs, and the results processed by the server controller 21. The server memory 22 has a command storage area 22a in which command files are stored. The transmitter/receiver 23 transmits and receives, for example, image data from the multifunction apparatus 1 via the network 4. The transmitter/receiver 23 is, for example, a network card mounted on, for example, the support server 2.

The input command receiver 24 receives a command file, which the personnel received from an external server and inputted by the personnel at the support center, via the transmitter/receiver 23. The input command receiver 24 then stores the received command file into the command storage area 22a of the server memory 22. The file server 3 or a second server is a computer that stores therein, for example, the image data received from the multifunction apparatus 1. The file server 3 has a plurality of folders defined in a memory (not shown).

A description will be given of a recovery process when the quality of a printed image is poor and the user is unable to attend to the situation. Assume that the support server 2 has been assigned a server name "support.cloud.com" and the file server 3 has been assigned a server name "file.server.com".

The multifunction apparatus 1 has a unit identifier in the form of a serial number, which identifies the multifunction apparatus 1. The connection information storing area 12a of the apparatus memory 12 holds connection information, e.g., a connection address at which the multifunction apparatus 1 is connected to, for example, the support server 2. The display screen 14a includes a message area 17 in which a message appears to inform the user that the multifunction apparatus 1 has begun a scanning operation. As shown in FIG. 4, a START button 18 and a HELP button 19 are disposed next to the message area 17. The user operates the START button to command an original reading process, and the HELP button 19 to command a diagnostic process when the information processing system malfunctions.

When a problem occurs in a printed image during a printing process in the multifunction apparatus 1, the user telephones the support center and reports to the personnel at the support center on the details of the problem. If, in response to the report, the personnel at the support center determines that a problem actually exists in the printed image and the printed image requires to be examined, the personnel asks the user to send the image, which is read from the original document, to the support center. The user then places the original document, from which the affected image resulted, on the platen of the scanner 15, and then presses the HELP button 19 in the display screen 14a. During the telephone communication, the personnel at the support center also obtains the serial number of the multifunction apparatus from the user.

Upon reception of the user's report, the personnel at the support center operates his terminal (not shown), for example, a personal computer to produce destination information including the address of the file server 3 to which the affected image is to be sent, and a command file that includes a scan initiating command. The personnel then transmits the command file and the serial number assigned to the multifunction apparatus 1 to the support server 2. The input command receiving section 24 of the support server 2 receives the command file through the transmitter/receiver 23, and then stores the command file into the command storage area 22a in the server memory 22, the command file being associated with the serial number of the multifunction apparatus 1.

With reference to FIG. 5, a description will be given of the processes performed by the multifunction apparatus 1, support server 2, and file server 3 when image data is transmitted from the multifunction apparatus 1 to the support center. Steps "S XX" are performed by the multifunction apparatus 1. Steps "SA XX" are performed by the support server 2. Steps "SB XX" are performed by the file server 3.

S1: The user is asked to send the image of the original document, from which the affected image resulted, and places the original document on the platen of the scanner 15 of the multifunction apparatus 1.

S2: In response to the instruction from the personnel at the support center, the user presses the HELP button 19 on the initial screen displayed on the display screen 14a.

S3: When the HELP button 19 has been pressed, the apparatus controller 11 of the multifunction apparatus 1 executes a pre-installed program for obtaining a command from the support server 2. Specifically, the apparatus controller 11 reads the serial number of the multifunction apparatus 1 from the apparatus memory 12 and the connection information from the connection information storing area 12a. The apparatus controller 11 then transmits to the support server 2a command request to which the serial number has been attached. The command request is transmitted to http://support.cloud.com/inquire using a method, for example, the HTTP POST method. The apparatus controller 11 then proceeds to step S4.

SA1: The server controller 21 of the support server 2 receives the command request from the multifunction apparatus 1, and then proceeds to step SA2. If the server controller 21 does not receive the command request, the server controller 21 remains in a standby state.

SA2: Upon reception of the command request from the multifunction apparatus 1, the server controller 21 searches the command storage area 22*a* in the server memory 22 using the received serial number. If a command file associated with the serial number is found in the command storage area 22*a*, the server controller 21 proceeds to step SA3. If a command file associated with the serial number is not found, the controller 21 informs the multifunction apparatus 1 that a command file associated with the serial number does not exist, and then jumps back to step SA1 where the apparatus controller 21 enters the standby state to wait for another command request.

SA3: Upon detection of a command file associated with the serial number, the server controller 21 transmits the detected command file, which contains the destination information, for example, the address of the file server 3 to which the affected printed image is to be transmitted, and a scan initiating command. The server controller 21 then proceeds to step SA4.

The following command files are transmitted to the multifunction apparatus 1.
"success":"true"
"command":"start_scan"
"filename":"image123456.pdf"
"destination":"file. server.com/scan/"

"success":"true" indicates that a command associated with a command request actually exists in the command storage area 22*a*. "command":"start_scan" is a command name, which means a scan initiating command that commands the scanner 15 to start scanning. "file name":"image 123456.pdf" indicates that the file name is "image123456.pdf" when the image data of the affected image is stored into the file server 3. "destination": "file.server.com/scan/" indicates the destination (e.g., file server 3) to which the image data obtained by scanning the original document is to be transmitted and a storage area (/scan) into which the scanned image data is to be actually stored.

S4: The apparatus controller 11 enters the stand-by state after transmitting the command request, waiting for a command file from the support server 2 (Step SA3). If the received command file contains a command, the apparatus controller 11 proceeds to step S5: if not, the apparatus controller 11 jumps back to step S3 after a predetermined time elapse, and again transmits a command request to the support server 2.

S5: Once the apparatus controller 11 receives a command file that contains a scan initiating command, the apparatus controller 11 transmits a notification, which indicates a command process will be initiated, to the support server 2 (step SA4), and then proceeds to step S6. This notification is carried out by transmitting the following data
"command-result":"accepted"
to http://support.cloud.com/report by, for example, the HTTP POST method. The "command-result":"accepted" indicates that the multifunction apparatus 1 has accepted the command received from the support server 2.

SA4: Once the server controller 21 has transmitted the command file, the server controller 21 enters the standby state, waiting for the notification indicative that a command process will be initiated. If the server controller 21 receives the notification, the server controller 21 proceeds to step SA5: if not, the server controller 21 remains in the standby state.

SA5: When the server controller 21 has received the notification of initiation of the command process, the server controller 21 transmits an acknowledge notification as a reply to the notification of initiation of the command process. The acknowledge notification is implemented by transmitting the following data
"success":"true"
together with "200 OK", which is a HTTP response code, to the multifunction apparatus 1. "success":"true" indicates that there is no objection to the execution of the command process performed by the multifunction apparatus 1.

S6: After transmitting the notification of initiation of the command process at S5, the apparatus controller 11 of the multifunction apparatus 1 enters the standby state, waiting for the acknowledge notification. If the apparatus controller 11 has received the acknowledge notification, the apparatus controller 11 determines that the scanner 15 is now allowed to perform the scanning of the original document, and then proceeds to step S7: if not, the apparatus controller 11 remains in the standby state.

S7: The apparatus controller 11 causes the scanner 15 to start scanning the original document, and transmits a storage destination confirming request, which is to confirm whether the destination of the affected printed image i.e., the file server 3 (SB1), holds a folder that contains a storage destination folder. The apparatus controller 11 then proceeds to step S8. The image data of the affected image, which is contained in the command file received at step S4, is to be stored into "file.server.com/scan/." Therefore, using the WebDAV protocol, the apparatus controller 11 is linked to the file server 3 whose server name is "file.server.com". The apparatus controller 11 then transmits the storage destination confirming request using a HEAD command of HTTP, thereby confirming whether the folder "/scan", which is the storage destination, exists in the file server 3.

SB1: The file server 3 receives the storage destination confirming request from the multifunction apparatus 1, and then proceeds to step SB2. If the file server 3 does not receive the storage destination confirming request, the file server 3 remains in the standby state.

SB2: The file server 3 checks whether the file server 3 actually has a folder into which the image data of the affected image is to be stored. If the file server 3 has the folder therein, the file server 3 transmits a notification of existence to the multifunction apparatus 1, and then proceeds to step SB3. This notification of existence is, for example, a HTTP response code "200 OK".

S8: After transmitting the storage destination confirming request, the apparatus controller 11 waits for the notification of existence from the file server 3. If the apparatus controller 11 receives the notification of existence, the apparatus controller 11 determines that the file server 3 has the folder into which the image data of the affected image is to be stored, and then proceeds to step S9; if not, the apparatus controller 11 remains in the standby state.

S9: The apparatus controller 11 causes the scanner 15 to scan the original document placed on the platen of the scanner 15 to read the image of the original document.

S10: The apparatus controller 11 transmits the thus read image data of the original document to the file server 3, and then proceeds to step S11. The image data is transmitted together with, for example, "PUT/scan/image123456.pdf" of the HTTP PUT method.

SB3: If the file server 3 receives the image data of the original document, the file server 3 proceeds to step SB4; if not, the file server 3 remains in the standby state.

SB4: The file server 3 stores the received image data of the original document into the specified folder of the storage destination, assigning a specified file name. The file server 3 then proceeds to step SB5.

SB5: The file server 3 transmits a first notification, i.e., a notification of completion of data storage to the multifunction apparatus 1, the first notification indicating that the image data of the original document has been successfully stored. The file server 3 then jumps back to step SB1 where the file server 3 enters the standby state and waits for another storage destination confirming request from the multifunction apparatus 1.

S11: If the apparatus controller 11 receives the first notification after transmitting the image data to the file server 3, the apparatus controller 11 proceeds to step S12; if not, the apparatus controller 11 continues to remain in the standby state. The first notification is, for example, a HTTP response code "200 OK".

S12: Upon reception of the first notification, the apparatus controller 11 transmits a second notification, i.e., a notification of completion, which indicates that the command has been processed completely, to the support server 2, and then proceeds to step S13. This notification is carried out by transmitting the following data to http://support.cloud.com/report by the HTTP POST method, "command-result":"completed"/ the "command result":"completed" indicates that the scanned image of the original document has been successfully stored into the file server 3.

SA6: If the server controller 21 receives a notification of completion, then the server controller 21 proceeds to SA7; if not, the server controller 21 continues to remain in the standby state.

SA7: In response to the notification of completion, the server controller 21 transmits an acknowledgement of reception of the notification of completion to the multifunction apparatus 1, and then jumps back to step SA1 where the server controller 21 waits for another command request from the multifunction apparatus 1. The acknowledgement of receipt is implemented by transmitting the following data together with "200 OK", which is a HTTP response code, to the multifunction apparatus 1:

"success":"true"

where "success":"true" indicates that the server controller 21 has successfully received the notification of completion from the multifunction apparatus 1.

S13: After transmitting the notification of completion, the apparatus controller 11 enters the standby state. If the apparatus controller 11 receives the acknowledgement of receipt from the support server 2, the apparatus controller 11 completes the current process and causes the human interface 14 to display the initial screen (FIG. 4) of the display screen 14a. In this manner, the information processing system according to the first embodiment performs the image data transmission process. After performing the image data transmission process, the personnel at the support center examines the affected image stored in the file server 3, determines the causes of the malfunction, and then suggests the user a procedure for recovering from the malfunction.

As described above, when, for example, white streaks appear in a printed image which cannot be solved by the user, and the actual affected image requires to be investigated, the user places the original document on the platen of the scanner 15 upon request from the personnel at the support center, and then presses the command button. Subsequently, without intervention by the user, the multifunction apparatus 1 automatically obtains a scan command, the destination to which the scanned image is to be transmitted, and the storage destination into which the scanned image is stored, so that the image data of the scanned image is stored into the file server 3 at the destination of the scanned image. This configuration eliminates the need for the user to input the destination, so that the image data obtained with the scanner 15 may be transmitted to the destination.

In the first embodiment, the multifunction apparatus 1 initiates the communication between the multifunction apparatus 1 and the support server 2. Even when the scanner 15 and the router 7 are located inside the firewall and therefore cannot be directly accessed over the Internet or a network, the image data of an affected image may be stored into the file server 3 without difficulty.

Second Embodiment

Figure 6:
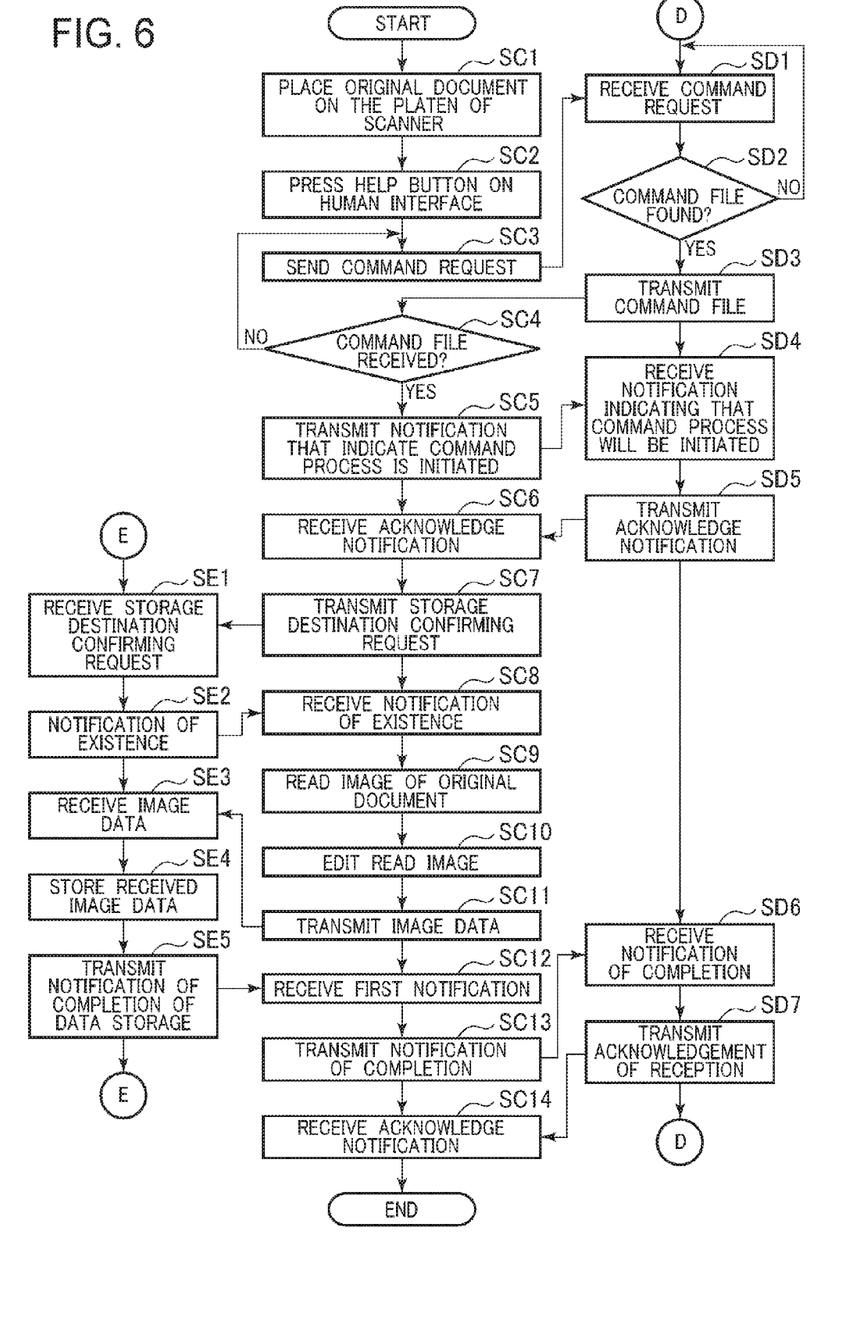
FIG. 6 is a flowchart illustrating an image data transmission process according to a second embodiment.
Figure 7A:
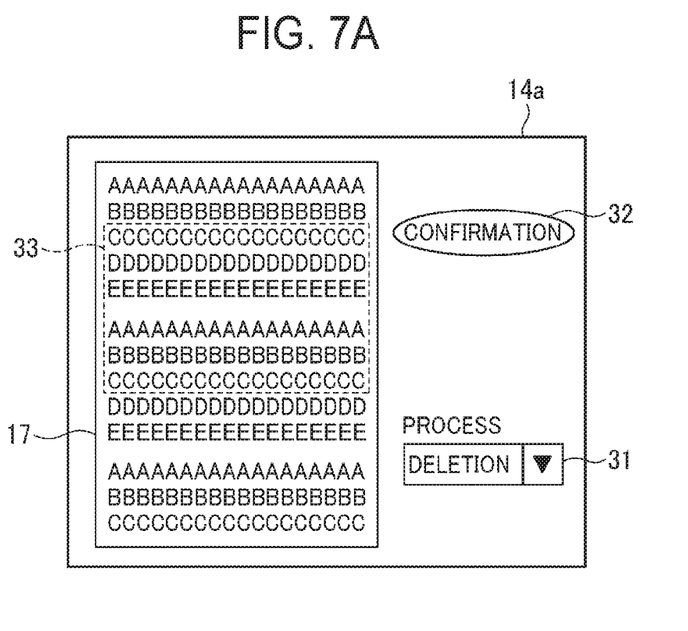
FIGS. 7A and 7B illustrate an exemplary editing screen according to the second embodiment.
Figure 7B:
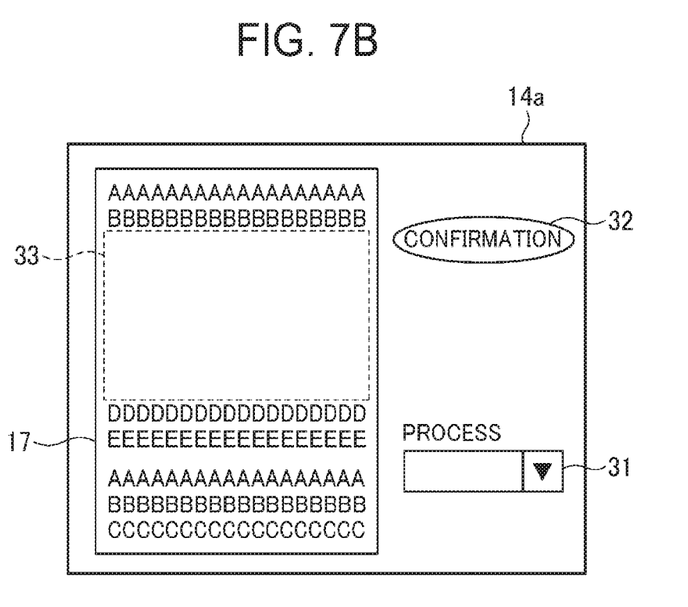

A second embodiment differs from the first embodiment in that the user is allowed to hide some information that should be kept secret from other people. FIG. 6 is a flowchart illustrating an image data transmission process according to a second embodiment. FIGS. 7A and 7B illustrate an exemplary editing screen according to the second embodiment.

An information processing system according to a second embodiment will be described in detail with reference to FIGS. 6, 7A, and 7B. Elements similar to those in the first embodiment have been given the same reference characters and their detailed description is omitted. The information processing system, a multifunction apparatus 1, a support server 2, and a file server 3 are of the same configuration as in the first embodiment.

A description will be given of the operation of the multifunction apparatus 1, support server 2, and file server 3 when the image data is transmitted from the multifunction apparatus 1 to the support server 2 and file server 3.

Steps "SC XX" are performed by the multifunction apparatus 1. Steps "SD XX" are performed by the file server 3. Steps "SE XX" are performed by the server 3.

Steps SC1 to SC9, SD1 to SD5, and SE1 to SE2 are the same as S1 to S9, SA1 to SA5 and SB1 to SB2 in the first embodiment. Therefore, their detailed description is omitted.

SC10: The scanner 15 of the multifunction apparatus 1 reads the image data of the original document, and the multifunction apparatus 1 then produces display data based on the image data, so that a display 14 displays an editing screen in a display screen 14a. FIG. 7A illustrate the editing screen in which the image obtained by scanning the original document appears in a message display area 17. A scroll bar 31 and a CONFIRMATION button 32 appear near the message display area 17. The scroll bar 31 is used for instructing an actual process in the image processing. The CONFIRMATION button 32 is used for commanding to complete the editing process.

If the scanned image contains classified information and/or private information which should be kept secret from other people, the user performs the editing process to keep the information secret from other people. Specifically, the user specifies a portion or an area 33 of the information to be protected on the human interface 14. The user operates the scroll bar 31 to specify the portion of the displayed image, i.e., the area 33.

In accordance with the instructions input from the scroll bar 31, an apparatus controller 11 performs the image processing on the image data in the specified area 31, and then causes the human interface 14 to display the scanned image, which has been processed, in the message area 17. For example, if the user specifies "deletion" by operating the scroll bar 31, the specified area 33 will be blanked as shown in FIG. 7B.

The user then inspects the read image, which has been subjected to the image processing. If the processed image is ready for transmission, the user presses the CONFIRMATION button 32. If the processed image requires to be re-edited, the user instructs the additional image processing of the image by specifying the area 33 to be re-edited and by operating the scroll bar 31 to specify the required processes for re-edition.

SC11: When the user has pressed the CONFIRMATION button 32, the apparatus controller 11 determines that the image to be transmitted has been confirmed, and then transmits the image data of re-edited image to the file server 3. The apparatus controller 11 then proceeds to step SC12. The re-edited image data is transmitted together with, for example, "PUT/scan/image123456.pdf" of the HTTP PUT method.

Steps SE3-SE5 at the file server 3 are the same as steps SB3-SB5 of the first embodiment.

Steps SC12-SC14 at the multifunction apparatus 1 are the same as steps S11-S13 of the first embodiment.

Steps SD6-SD7 at the support server 2 are the same as steps SA6-SA7 of the first embodiment.

In this manner, the image data transmission process according to the second embodiment is carried out. Selections and instructions associated with the area 33 specified by the user have been described as being performed by operating the human interface 14. Instead, the selections and instructions may be inputted from the user terminal, e.g., the user's personal computer connected to the multifunction apparatus 1.

The image processing according to the second embodiment has been described in terms of "deletion" of portions of an image, the image processing may include "black-out" and "mosaic". In addition to the advantages provided by the first embodiment, the second embodiment provides the following advantages. That is, when the user cannot handle a problem, for example, white streaks that appear in a printed image and the user requires to transmit the image data of the affected image to an external apparatus, if the image data contains classified information, the user is allowed to delete a portion of the image that should be kept secret from other people. This configuration improves protection of private information and classified information.

The multifunction apparatus 1 according to the first and second embodiments have been described in terms of an MFP. The present invention may also be applied to a copying machine, a facsimile machine, and other multifunction apparatus.

What is claimed is:

1. An information processing system, comprising:
a multifunction apparatus, a first server and a second server which are linked to one another over a network,
wherein the multifunction apparatus comprises:
a scanner configured to scan an original document placed on a platen and read an image of the original document;
a first transmitter/receiver configured to perform a function of transmitting and receiving; and
an apparatus controller configured
to send a first request for obtaining a destination information to the first server through the first transmitter/receiver,
to obtain a command file including the destination Information from the first server through the first transmitter/receiver,
to send, to the first server, a first notification indicating initiation of a command process according to the command file before the scanner reads the image through the first transmitter/receiver,
to obtain a second notification as a reply to the first notification through the first transmitter/receiver,
to send a second request to the second server through the first transmitter/receiver after obtaining a second notification,
to obtain a fifth notification through the first transmitter/receiver in response to the second request, and
to cause the scanner to start scanning the original document and read the image in response to the fifth notification, and
to send the read image to the second server according to the command file through the first transmitter/receiver,
the first request including a first unit identifier identifying the multifunction apparatus, the destination information indicating a destination to which the read image is transmitted;
wherein the first server comprises:
a first memory in which destination information indicating the second server as the destination is stored; and
a second transmitter/receiver configured to perform the function of transmitting and receiving; and
a server controller configured
to obtain the first request through the second transmitter/receiver,
to send the command file to the multifunction apparatus through the second transmitter/receiver in response to the first request,
to obtain the first notification through the second transmitter/receiver, and
to send the second notification to the multifunction apparatus through the second transmitter/receiver in response to the first notification; and
wherein the second server transmits a third notification to the multifunction apparatus after the read image from the multifunction apparatus has been stored in a second memory.

2. The information processing system according to claim 1, wherein the multifunction apparatus transmits a fourth notification to the first server after receiving the third notification.

3. The information processing system according to claim 1, wherein the apparatus controller is configured to edit the read image and subsequently send the edited read image to the second server through the first transmitter/receiver.

4. The information processing system according to claim 1, wherein
the first memory stores the first unit identifier with the first unit identifier associated with the command file, and
the multifunction apparatus further comprises a third memory in which the first unit identifier is stored.

5. The information processing system according to claim 4, wherein the server controller searches the first memory for the command file associated with the first unit identifier.

6. The information processing system according to claim 1, wherein the command file includes the destination information and a scan command associated with the destination information, the scan command being issued to the scanner so that the scanner reads the image of the original document.

7. The information processing system according to claim 1, wherein the multifunction apparatus is linked to the Internet as the network through a local area network, the first server and the second server being linked to the Internet.

8. The information processing system according to claim 7, wherein the first server is a support server; and the read image is an affected image read by the scanner when a problem occurs in the multifunction apparatus.

9. The information processing system according to claim 3, wherein the multifunction apparatus further comprises a display configured to display the read image; and the apparatus controller is configured to edit the read image according to operation of the displayed image.

10. The information processing system according to claim 9, wherein the apparatus controller is configured to edit the read image by deletion, black-out, or mosaic to generate the edited read image.

11. The information processing system according to claim 1, wherein the apparatus controller is configured to send the read image to the second server through the first transmitter/receiver after obtaining the fifth notification, the second request requesting the second server to confirm whether the second server has a folder, which is the destination indicated by the destination information, to store the read image, the fifth notification indicating existence of the folder; and the second server is configured to receive the second request from the multifunction apparatus, confirm the existence of the folder, and transmit the fifth notification to the multifunction apparatus.

12. The information processing system according to claim 1, wherein the multifunction apparatus further comprises a human interface; and the apparatus controller automatically executes processes from sending the first request to sending the read image, when the human interface receives a command from a user.

13. The information processing system according to claim 2, wherein the server controller obtains the fourth notification through the second transmitter/receiver and sends, to the multifunction apparatus through the second transmitter/receiver, a sixth notification indicating that the first server successfully receives the fourth notification.

14. The information processing system according to claim 3, wherein when information to be protected is included in the read image, the apparatus controller protects the information to be protected.

\* \* \* \* \*